Inventors:
Chester L Lewis
Harry O. Setterberg

Nov. 11, 1930.    C. L. LEWIS ET AL    1,781,183
SEALING PISTON RING
Filed April 19, 1928    2 Sheets-Sheet 2
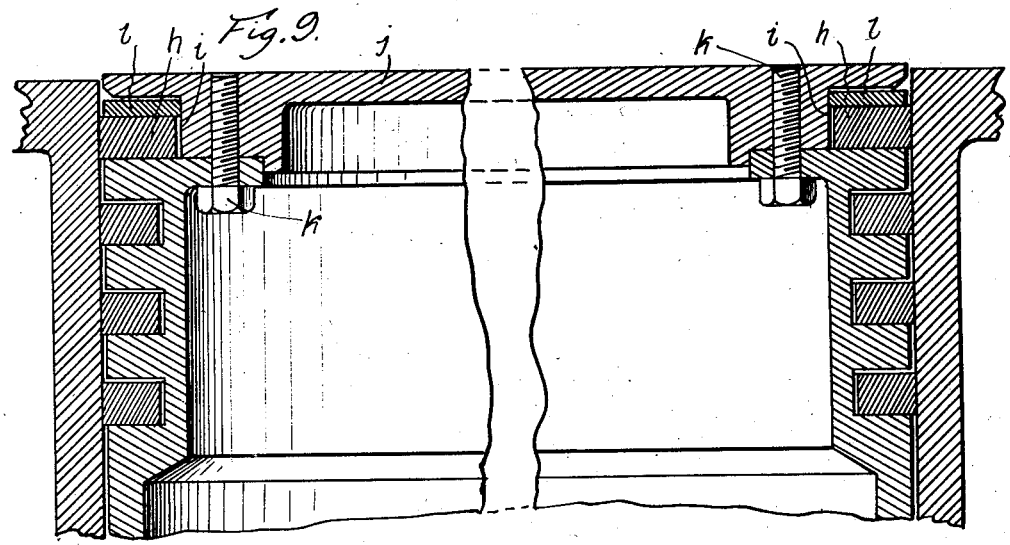
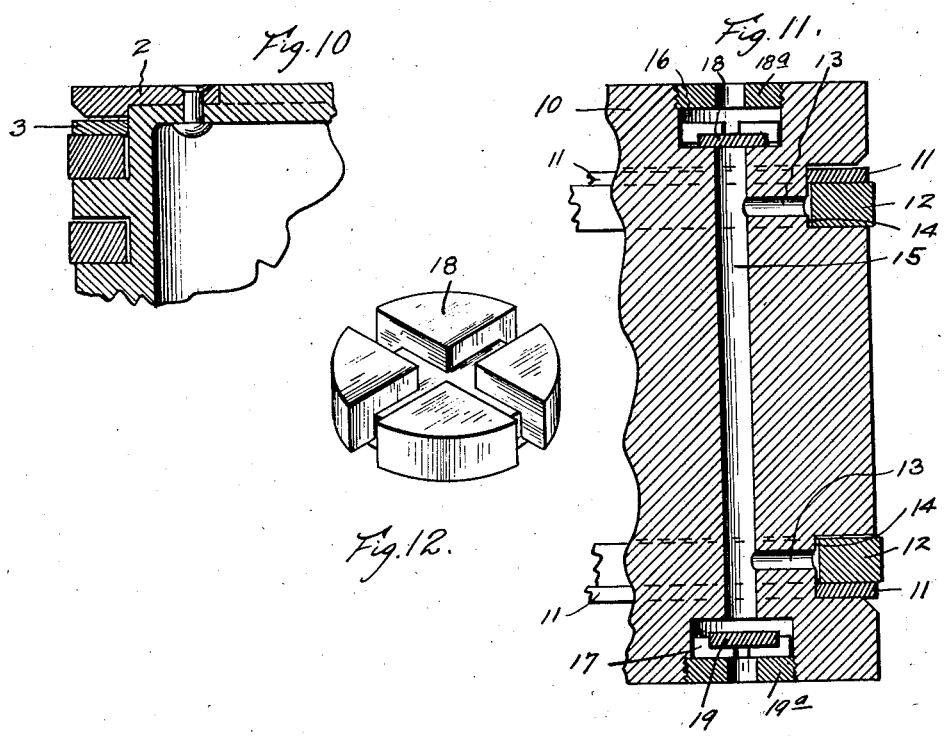
Inventors
Chester L. Lewis
Harry O. Setterberg Patented Nov. 11, 1930

1,781,183

UNITED STATES PATENT OFFICE

CHESTER L. LEWIS AND HARRY O. SETTERBERG, OF PORTLAND, OREGON

SEALING PISTON RING

Application filed April 19, 1928. Serial No. 271,231.

Our invention has for its object the preventing of undue wear of the cylinder walls and piston rings of engines, and similar devices.

We have discovered that undue wear of the walls of the cylinder, and the piston rings is largely due to fluid pressures being permitted to enter behind the piston rings, thus causing the latter to bear with excessive force on the cylinder walls.

As is well known, the spring inherent in the metal of which the piston rings are usually constructed generally represents a pressure of about six to eight pounds per square inch, but with the gas pressures introduced behind the piston ring, these pressures not infrequently climb to six hundred pounds per square inch, in internal combustion engines; hence, the undue wear unavoidably resulting with such enormous pressures. And, of course, when the cylinder walls or the piston rings are once worn to such extent that the gas pressures are no longer confined to the top of the piston, the engine no longer functions efficiently; and, besides, the gases passing by the piston ring tend to break down the lubricating oil, and in that way augment the undue wear.

The common piston ring itself cannot be arranged so as to bar the entrance of the gas pressures behind it; for no matter how neatly the piston ring is fitted in its groove, some fractional space must be allowed between the top surface of the piston ring and the opposed surface of the groove of the piston, so as to permit the piston ring some relative transverse motion in its groove. And it is through such minute passage-way that the gas pressures enter behind the piston ring, and wear on these minute passage-ways is especially severe on the first or upper piston ring, with the result that the ring and groove wear rapidly and the ring quickly becomes very loose in its grooves.

We are aware that attempts have heretofore been made to exclude the pressure from behind the piston ring, but the means employed of which we have any knowledge failed, and were incapable of producing the result intended.

Our invention resides in providing means for preventing the gas pressures from building up behind the piston ring. The means we have invented for this purpose consist of a sealing ring slidably seated on the piston ring the upper surface and periphery of which is exposed to the gas pressures in the cylinder, so that by such pressures the sealing ring will be held firmly down on the piston ring, and, at the same time, the interior periphery of the sealing ring will be held in firm contact with the inner longitudinal wall of the groove in which the piston ring is located. Thus the high gas pressures occurring in the cylinder serve to hold the sealing ring in position for closing substantially the passage-ways from the cylinder into the space behind the piston ring. Since it is impossible, in practice, to effect the entire exclusion of the pressure from behind the piston rings, means must be provided to relieve such pressure as may be set up there, by leakage; such means to be adapted to permit the pressure to escape from behind the piston ring into the body of the cylinder below the piston ring, thus into larger space.

Our invention may be applied to the pistons of all types of reciprocating engines, by simply enlarging the groove of the piston ring longitudinally or narrowing the piston ring to accommodate the sealing ring.

Where it is preferred to employ a deep piston ring and a correspondingly deep sealing ring, the head of the piston must be made with a removable section so as to permit the insertion of such deep rings.

Relief of the pressure behind the piston ring, due to leakage past the sealing ring, may be accomplished by providing the piston ring with a suitable scarf as hereinafter described; or by providing the space behind the piston ring with a valve controlled vent.

The details of our invention are hereinafter fully described with reference to the accompanying drawings.

In such drawings:

Figs. 9 and 10 show modifications of a piston adapted for piston and sealing ring of relatively greater depth in which the head of the piston is made removable;

Fig. 11 shows a further modification adapted for reciprocating pistons, in which the pressure is continuous rather than momentary.

Fig. 12 shows a detail of one of the valve discs employed in the combination illustrated by Fig. 11.

Figure 1:
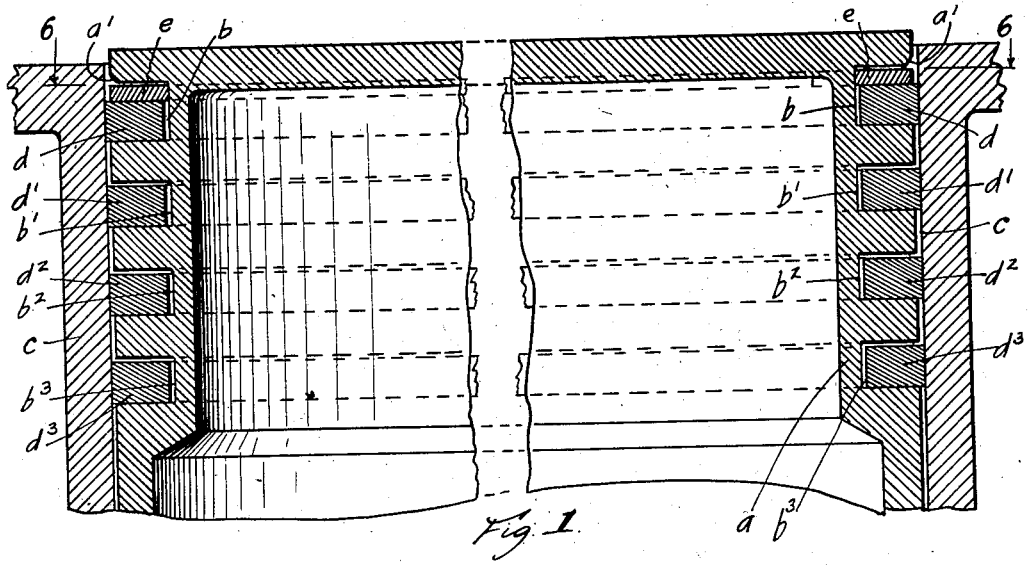
Fig. 1 shows a central longitudinal section of a piston and its cylinder illustrating the relative arrangement and proportions of the sealing and piston rings.
Figure 2:
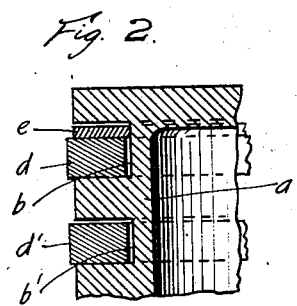
Figs. 2, 3, 4 and 5 show fragmentary sections of a piston and illustrate modifications of the sealing ring and the groove therefor.

Referring now to Figures 1 to 7 inclusive, a piston $a$ is provided, of the usual form, and provided with a number of circumferential grooves $b$, $b'$, $b^2$ and $b^3$. The piston is arranged in its cylinder $c$ and the grooves are also of the usual form except that the groove $b$ is of the same depth but somewhat wider than the other grooves. Piston rings $d$, $d'$, $d^2$ and $d^3$ are arranged in the grooves.

A sealing ring $e$ is mounted in the groove $b$ bearing on and overlying the ring $d$. The sealing ring $e$ is circular and relatively thin but of approximately the same width as the piston ring. The circumferential edge of the piston wall above the groove $b$ is beveled so as to expose a portion of the circumferential rim of the sealing ring to the pressure, and the sealing ring has a sliding fit in the groove $b$ on the piston ring thereby providing a space between the top face of the sealing ring and opposed to the wall surface of the piston in which the pressure can enter to bear the sealing ring firmly down on the piston ring. The sealing ring is split as at $f$, Fig. 6, to permit it to be sprung open sufficiently to be snapped into the groove $b$ in a manner similar to the way the piston rings are mounted in their grooves. The sealing ring is adapted, however, to bear firmly against the inner wall of the groove $b$ and its outer circumferential edge does not touch the wall of the cylinder so as to leave a space for the pressure to bear against the outer edge of the sealing ring and hold the same firmly, and in gas tight relation, against the inner wall of the groove $b$.

In Figure 9 is shown a modification of our invention adapted for pistons provided with a wider piston ring $h$ and correspondingly deeper groove $i$, which can not be sprung sufficiently to be snapped into place. To overcome this, the head $j$ of the piston is made removable and held in place by bolts $k$. The construction of the sealing ring $l$ in this modification is relatively similar except that it is wider to correspond to the width of the piston ring.

Fig. 10 shows a modified piston, in which only a circumferential portion 2 of the head is removable. This modification is adapted to permit a sealing ring 3 of one piece, that is not split, to be mounted over the piston ring 4. Of course, this modification is also adapted for a wide piston ring, which can not be sprung sufficiently to be snapped into its groove, as shown in Fig. 9.

Figs. 11 and 12 show a modification of our invention adapted for high pressure pumps or steam cylinders or other devices in which the pressures of the working fluid is continuous, not momentary, as in an internal combustion engine.

The piston 10 in this modification is double ended, that is reciprocating, and sealing rings 11 are provided overlying the piston rings 12 on the surfaces adjacent to the respective ends of the piston.

Since in this type, the pressure is continuous a small amount of fluid will tend to enter the space behind the piston and force the piston ring outwardly against the wall of the cylinder. To provide means to permit this fluid to escape from behind the ring a conduit 13 is provided leading from the groove 14 to a longitudinal conduit 15 opening at each end of the piston. Recesses 16 and 17 are provided at each end of the conduit 15 in which are seated check valves 18 and 19 held in place by caps 18$^a$ and 19$^a$ threaded into the said recesses to hold the check valves in place. The pressure of the fluid will thus close the respective valve and the fluid in the conduits may escape through the other valve against which there is relatively less pressure.

Figure 3:
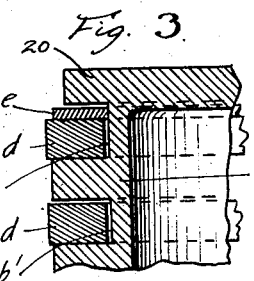
Figure 4:
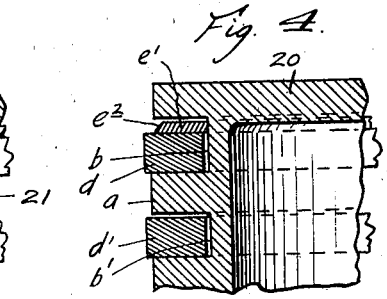
Figure 5:
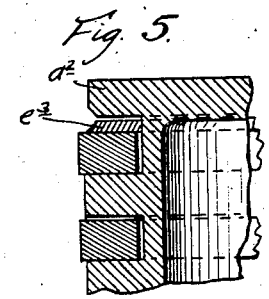
Figure 6:
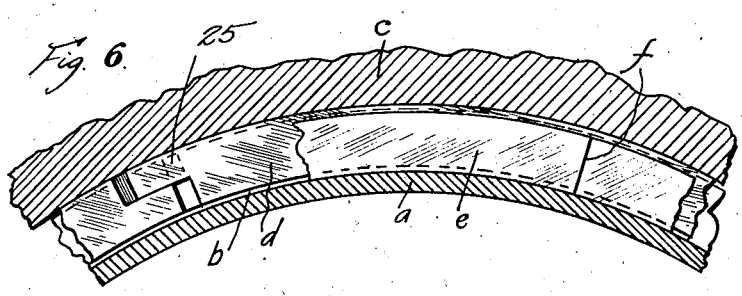
Fig. 6 shows in a section taken on the line 6—6 of Fig. 1, the relative position of the sealing and piston rings in the groove and the wall of the cylinder, and illustrates the means provided for sealing the contiguous ends of the piston ring.

In order to insure that the pressure of the impelling fluid will bind the sealing ring tightly and closely against the piston ring and the inner wall of its groove to prevent the fluid from passing behind the piston ring, we have shown in Figures 1, 3, 4 and 5 respectively supplementary means provided to assist the pressure of the fluid to act upon the sealing ring. In Fig. 1 the upper edge of the groove $b$ is beveled as at $a'$, thus exposing a portion of the surface of the ring to the direct pressure of the fluid. In Fig. 3, the head 20 of the piston is constructed of slightly less diameter than the body of the piston 21 thus exposing not only a portion of the upper surface of the sealing ring $e$, but also permitting the fluid to bear against the periphery of the ring. Fig. 4 shows a sealing ring $e'$ beveled as at $e^2$, the head of the piston also being of slightly less diameter than its body. Fig. 5 shows a form similar to Fig. 4 except that both the sealing ring $e^3$ and the piston head $a^2$ are beveled at their adjacent edges.

Figure 7:
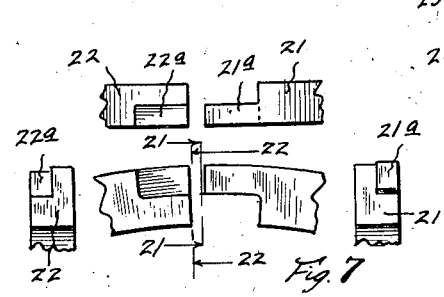
Fig. 7 shows fragmentary views illustrating the arrangement of a scarf element of the piston-ring, adapted to prevent substantially the passage of pressure back to the underside of the sealing ring, but permitting the escape of the pressure from behind the piston ring down into the body of the cylinder.

To further insure that no fluid will pass behind the piston ring, we construct the contiguous ends 21 and 22 respectively of the piston ring as shown in Fig. 7, with a tongue $21^a$ projecting circumferentially from the end of the ring and adapted to be seated in a groove $22^a$ formed in the adjacent end. By this construction the greater the pressure the more closely the tongue $21^a$ will bind in the groove $22^a$ and by arranging the tongue and groove on the surface of the ring adjacent the head of the piston and since the pressure is downward, the fluid to pass behind the contiguous ends, must pass between the said tongue and groove and consequently be substantially hindered.

At the same time since some leakage of pressure behind the piston ring will occur, it must be taken care of; that is, allowed to escape into the body of the cylinder. To this end, by the arrangement of the scarf of the piston ring shown in Fig. 7, an opening is provided at 25 through which the pressure can so escape.

Figure 8:
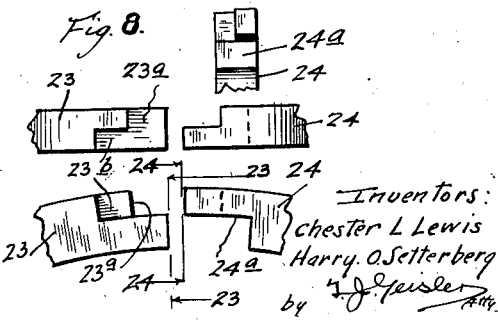
Fig. 8 shows similar details of another type of scarf for the piston ring.

Fig. 8 shows a modification of this feature, adapted to permit the piston ring to be mounted in its groove with either of its surfaces uppermost. A recess $23^a$ formed with a tongue shaped portion $23^b$ is provided in the outer surface of the piston ring at the end 23 and a correspondingly complementary shaped recess $24^a$ is provided in the surface of the adjacent end 24, so that when the two ends are together, the end of each ring will fill the recess in the other, sealing the junction of the two ends against the fluid.

The operation of our improvement will be readily understood, by all practical in the art, from the description above given.

By constructing the contiguous ends of the piston ring, fluid is also prevented from working through any space between the two ends.

Furthermore sealing rings may be provided in the second piston ring grooves or all of them, if desirable, which might be the case in Diesel engines, as the wear on the piston rings in this type is especially severe.

We claim:

1. In combination, a cylinder and a piston therein provided with a circumferential groove, a piston ring seated in said groove, and a sealing ring seated on the pressure side of the piston ring, the sealing ring having lesser diameter than the piston ring, the circumferential edge and the top of the sealing ring being exposed to the pressure in the cylinder, the piston ring being provided with a scarf preventing substantially the passing of the pressure to the inner side of the piston ring, and means adapted to permit the pressure entering behind the piston ring to escape into the body of the cylinder below the piston ring.

2. In combination, a cylinder and a piston therein provided with a circumferential groove, a piston ring seated in said groove, and a sealing ring seated on the pressure side of the piston ring, the sealing ring having a lesser diameter than the piston ring, the circumferential edge and the top of the sealing ring being exposed to the pressure in the cylinder, the piston ring being provided with a scarf preventing substantially the passing of the pressure to the inner side of the piston ring, and the scarf of the piston ring being adapted to permit the pressure entering behind the piston ring to escape into the body of the cylinder below the piston ring.

CHESTER L. LEWIS.
HARRY O. SETTERBERG.